E., E. C., & E. W. STRANGE.
UNIVERSAL JOINERS.

No. 180,735. Patented Aug. 8, 1876.

Witnesses:
Sam'l R. Turner
John A. Ellis

Inventors:
Elias Strange
Emerson C. Strange
Elias W. Strange
By their Atty. J. Dennis Jr

UNITED STATES PATENT OFFICE.

ELIAS STRANGE, EMERSON C. STRANGE, AND ELIAS W. STRANGE, OF TAUNTON, MASSACHUSETTS.

IMPROVEMENT IN UNIVERSAL JOINERS.

Specification forming part of Letters Patent No. 180,735, dated August 8, 1876; application filed April 25, 1874.

*To all whom it may concern:*

Be it known that we, ELIAS STRANGE, EMERSON C. STRANGE, and ELIAS W. STRANGE, of Taunton, in the county of Bristol and State of Massachusetts, have invented an Improvement in Universal Joiners, of which the following is a specification:

The invention will first be fully described, and then pointed out in the claims.

Figure 1:
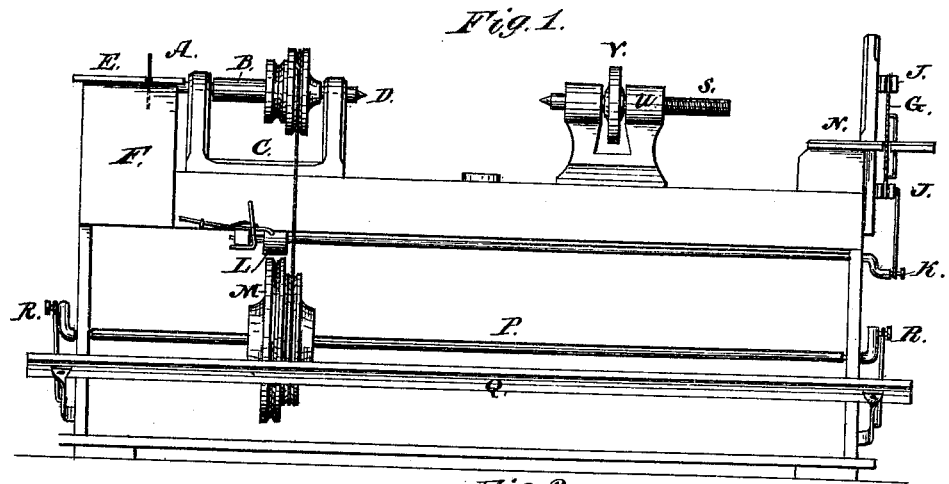
Figure 2:
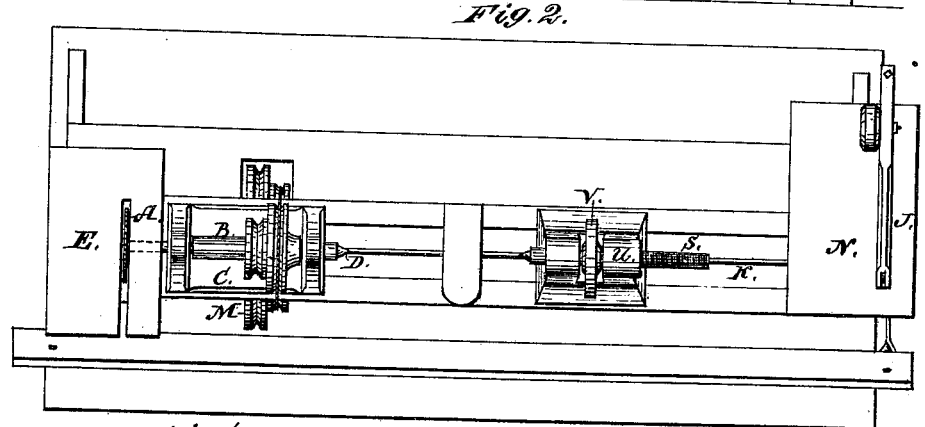
Figure 3:
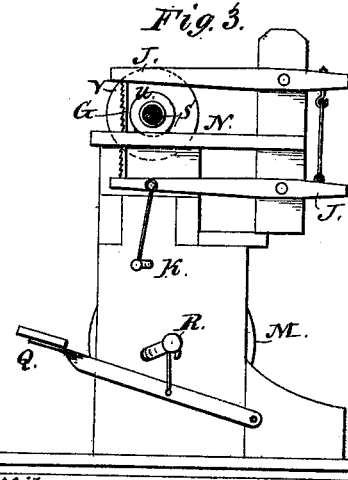
Figure 4:
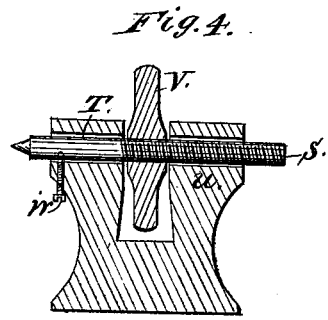

Figure 1 is a side elevation of our improved lathe. Fig. 2 is a top view. Fig. 3 is an end elevation. Fig. 4 is a section of the tail-stock.

Similar letters of reference indicate corresponding parts.

A represents a circular saw mounted on one end of the live-spindle B, at the side of the stock C, opposite to the center D, and projecting a suitable distance beyond the stock to make the room required between it and the saw for the work. E represents the saw-table, which we arrange on suitable supports F. G represents the jig-saw, arranged at the other end of the lathe, being mounted on the rock-levers J, one of which is connected to a crank-shaft, K, which has a small pulley or roller, L, on its opposite end, and is arranged to be let down on a driving-pulley, M, to be revolved by friction or by a belt. This saw is also provided with a table, N, arranged on supports O. The pulley-shaft P is extended the whole length of the lathe. The treadle Q is also extended and connected to the pulley-shaft at each end by a crank, R, so that it can be worked at the ends and all points along the lathe, to allow the operator to work at either machine.

S represents the tail-screw. It is fitted directly in the bore T of the stock U. V is a wheel-nut fitted on the screw, between the two uprights. The stud-pin W in the tail-stock U, working in a slot in the center, prevents it from turning.

Having thus described our invention, we claim as new and desire to secure by Letters Patent—

1. In combination with a turning-lathe, having a rotary spindle, B, extended beyond the rear of the head-stock, a circular saw, A, fastened to the rear end of the rotating spindle, with the table E adapted to the saw, so that the lathe may be used for sawing and turning at one and the same time.

2. A turning-lathe bench, with head and tail stocks C and U, in combination with a circular saw, A, on the rear end of the lathe-spindle B, with saw-table E on the lathe-bench, and a jig or reciprocating saw, G, and table on the rear end of the lathe-bench, the whole constructed and arranged substantially as shown and described, to operate at the same time by the same pulley or crank-shaft.

ELIAS STRANGE.
EMERSON C. STRANGE.
ELIAS W. STRANGE.

Witnesses:
HENRY WILLIAMS,
GEO. H. BABBITT.